Patented Aug. 6, 1935

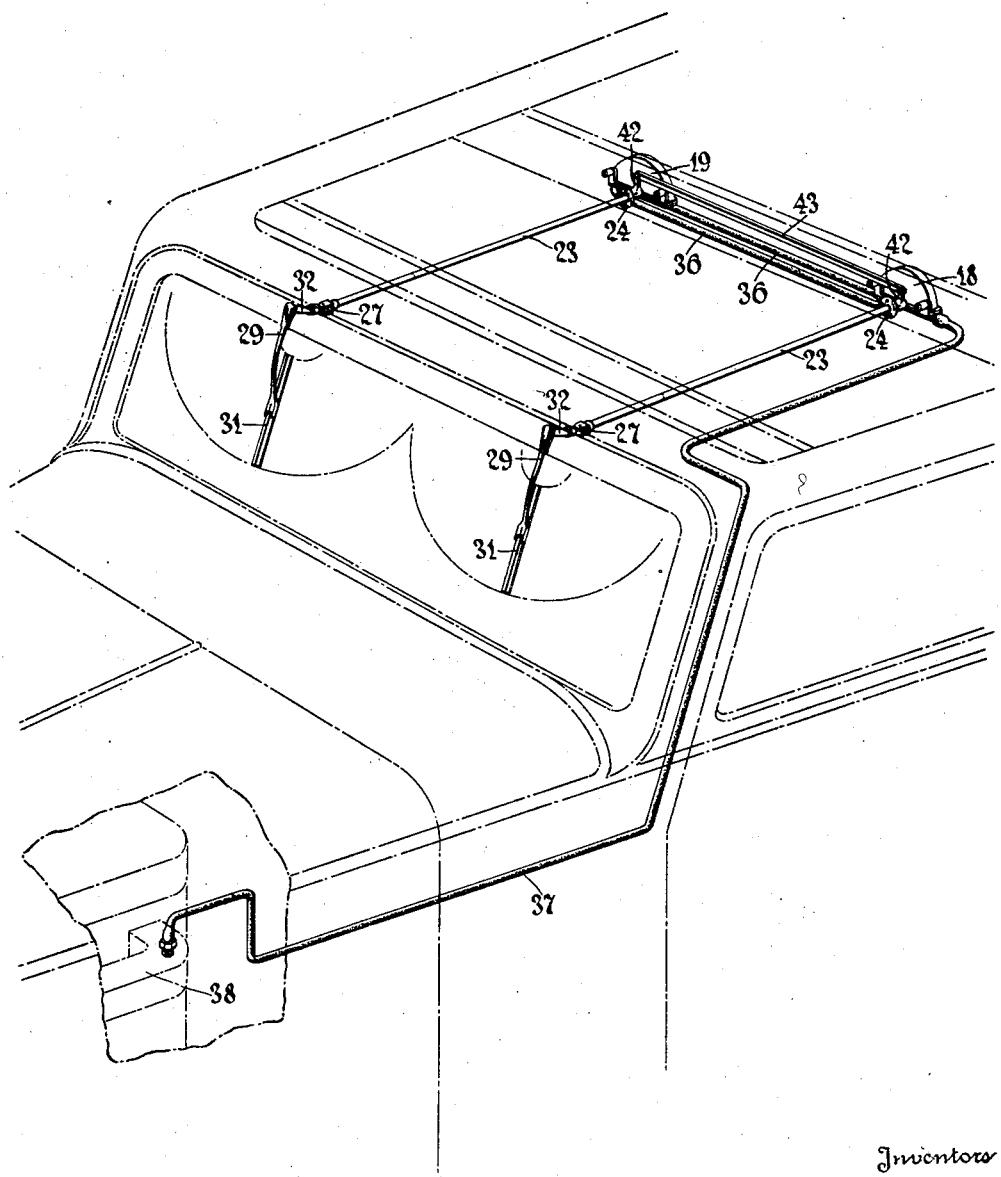

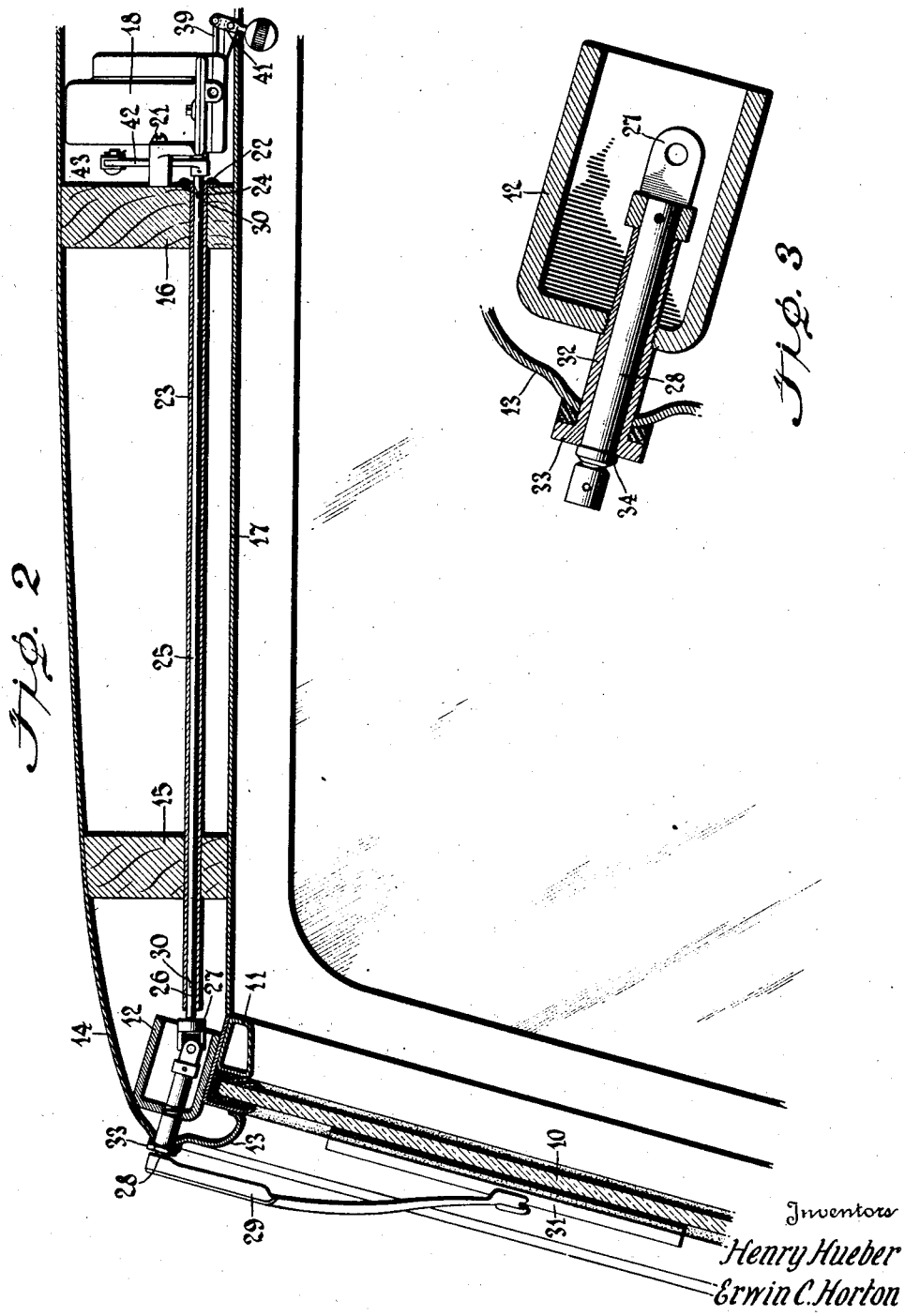

2,010,693

UNITED STATES PATENT OFFICE 2,010,693

WINDSHIELD CLEANER MOUNTING

Henry Hueber, Buffalo, and Erwin C. Horton, Hamburg, N. Y., assignors to Trico Products Corporation, Buffalo, N. Y.

Application September 14, 1932, Serial No. 633,177

10 Claims. (Cl. 296—84)

This invention relates to windshield cleaners for motor vehicles, and has particular reference to an improved manner of mounting the cleaner mechanism upon the vehicle and an improved relationship between the parts of the vehicle body and the cleaner mechanism.

In recent motor vehicle designs the header structure, above the windshield, has been utilized to house the actuating motor or motors, and actuating linkage, for windshield wipers which are mounted to reciprocate across the exterior face of the windshield. Such cleaner mechanism, in addition to the actuating motor or motors and the actuating linkage, usually includes one or more wiper blades, and a supporting arm for each blade carried by a shaft journalled to oscillate about an axis substantially normal to the plane of the windshield. In order to reduce the frontal area of the vehicle body and to improve the appearance of the body, it is desirable to reduce the height of the header structure to such degree that it will no longer suffice to house the cleaner motor and any actuating linkage.

The present invention comprehends the mounting of the motor or motors, and the actuating linkage, if any be used, considerably to the rear of the header structure, or where the roof and ceiling of the vehicle are sufficiently diverged to accommodate such mechanism.

Further, it is sometimes desirable to mount windshield operating mechanism or other accessories in the header structure, and any interference between such devices and windshield cleaner mechanism is to a large degree obviated by the present invention.

These and other objects and advantages will become apparent from the following description of the typical embodiment of the invention described in the accompanying drawings, wherein:

Fig. 1 is a phantom perspective view of a motor vehicle provided with a windshield cleaner in accordance with the present invention;

Fig. 2 is a longitudinal vertical section taken through the upper forward portion of the vehicle body, and disclosing the windshield cleaner mechanism mounted thereon; and Fig. 3 is a detail sectional view of a portion of the structure shown in Fig. 2.

As illustrated, the vehicle body comprises an upwardly and rearwardly inclined windshield 10 supported in a suitable frame 11. Above the windshield is a header structure including header bar 12 and the depending frontal portion 13 of the vehicle roof 14. The roof is supported by suitable frame members, including the longitudinally spaced beams 15, 16 which extend transversely of the body. Beneath the roof and frame members is a ceiling 17 which may be of metal, fabric, or other material. As shown in Fig. 2, the roof and ceiling are relatively close together adjacent the header bar and diverge as they extend rearwardly. Adjacent the beam 16 they are spaced sufficiently that a windshield cleaner motor may be mounted between them. A pair of motors 18, 19 is secured to the beam 16 by fasteners 21.

The forwardly extending shaft 22 of each motor extends into a tube 23 supported by the roof supporting means. As illustrated, for example, the tubes 23 extend through openings in the beams 15 and 16, and have flanges 24 secured to the beam 16. Journalled within the tubes 23 are drive shafts 25 having splined connections 30 to the motor shafts 22 and to shafts 26, journalled in the forward ends of the tubes. The shafts 26 are joined by flexible couplings 27 to wiper rock shafts 28 which support wiper blade carrying arms 29, the wiper blades 31 carried thereby being movable over the surface of the windshield as the motors 18, 19 oscillate or rock the shafts 22, 25, 26 and 28.

Each of the wiper rock shafts 28 is journaled in a tubular member 32 extended, in a direction substantially normal to the plane of the windshield, through aligned openings in the frontal portion 13 of the roof and the header bar 12, being secured to the latter in any suitable manner, as by screw threading. A flange 33 on each of the members 32 abuts the frontal portion 13, and may be of non-circular formation to enable the member to be threaded into the header bar with a wrench or other tool. The shafts 26 are provided at their forward ends with a shoulder 34 and, at their other ends, with a shouldered member of the coupling 27, as shown in Fig. 3, to prevent longitudinal displacement from the journal member 32.

The motors 18, 19 are preferably of the suction operated type described in our co-pending application Serial No. 437,579, filed March 20, 1930, each motor having a vane piston and the chambers on opposite sides of the piston of one motor being connected to the respective chambers of the other motor by conduits 36, 36, and a conduit 37 connecting the chambers of motor 18 to the intake manifold 38 of the vehicle engine, suitable automatic valve mechanism being included in the motor 18. A suitable control valve 39 carried by the motor 18 may be operated by a lever 41 which extends through an opening in the ceiling 17. The work to be performed by the two motors is equalized by connecting linkage comprising arms 42, 42, one carried by each motor shaft 22, and a bar 43 pivoted to the free end of each arm.

It will be understood that the present invention provides for the mounting of one or a plurality of blade type wipers of the angularly reciprocating type, wherein the actuating motor or motors are fully concealed in the vehicle top structure, in such manner that the motor control lever 41 is accessible to the operator of the vehicle. The motor or motors are mounted between the ceiling and roof where the latter are considerably spaced, thereby permitting the use of a comparatively low or narrow header structure which could not accommodate such motors. Likewise the motor unifying link 43 and arms 42 are disposed rearwardly of the header structure, concealed from view and yet in such position as not to interfere with the header structure or any accessories, such as windshield actuators which may be mounted in the header structure.

It will further be understood that the herein-described embodiment is merely illustrative of the inventive principles involved, and that the latter may be applied in various alternative forms, all within the contemplation of this invention.

What is claimed is:

1. In combination with a motor vehicle body including an inclined windshield, a header structure above the windshield, a roof extending rearwardly from the header structure and frame means for supporting said roof, a windshield wiper shaft journalled in said header structure with its axis substantially normal to the plane of the windshield, an arm carried by the shaft for supporting a wiper blade in cleaning relation to the windshield, a windshield cleaner motor mounted on said frame means remote from the windshield, a drive shaft connected to the motor and joined by a flexible coupling to said wiper shaft, and a tubular housing supported by said frame means and disposed between the motor and flexible coupling for journalling said drive shaft.

2. In combination with a motor vehicle body including a windshield, a header structure above the windshield, a roof and ceiling extending rearwardly from said header structure, and a frame member between the roof and ceiling disposed rearwardly of the windshield and substantially parallel thereto, a pair of wiper shafts journalled in spaced relation in said header structure, an arm carried by each of the shafts for supporting wiper blades in cleaning relation to the windshield, a pair of motors supported by said frame member and drive shafts connecting each of said wiper shafts with one of the motors, an arm carried by each of said drive shafts and a link pivoted to and connecting said arms for causing the motors to operate in unison.

3. In combination with a motor vehicle body including a windshield, a header structure above the windshield, a roof and ceiling including frame means therefor extending rearwardly from said header structure, a pair of spaced wiper supporting shafts journalled in means supported by the header structure, a pair of windshield cleaner motors disposed rearwardly of said header structure between the roof and ceiling and supported by said frame means, drive means connecting each motor with one of the wiper supporting shafts, means for causing said wiper motors to operate in unison, and control means on one of the motors for controlling both of the motors, said control means including a control lever extending downwardly through an opening in the ceiling.

4. In combination with a vehicle body including a windshield, a header bar above the windshield, and a roof extending rearwardly from the header bar and having a frontal portion extending forwardly and downwardly over the header bar, aligned openings substantially normal to the plane of the windshield formed in said frontal portion and the header bar, a tubular member extending through said openings and secured to the header bar, said tubular member having a flange at its forward end for abutting the forward surface of the frontal portion, a wiper carrying shaft journalled in said tubular member, said shaft having means adjacent each end of the tubular member for holding the shaft against longitudinal movement in the tubular member.

5. In a vehicle body including a windshield and frame therefor, a roof and a ceiling, a relatively low windshield header structure at the top of the windshield, said roof and ceiling extending rearwardly from the header structure, said header being situate within an acute angle defined by the upper surface of the windshield frame and said roof, a windshield wiper actuating shaft journalled in the header structure, a wiper arm for moving a wiper blade in cleaning relation to the windshield operatively connected to said wiper actuating shaft, a motor mounted between the roof and ceiling at a point remote from the header structure, and flexible drive means connecting said wiper actuating shaft and said motor.

6. In a vehicle body including a windshield and frame therefor, a roof and a ceiling, a relatively low header structure at the top of the windshield, said roof and ceiling extending rearwardly from the header structure and being vertically spaced a greater distance at a point remote from the header structure than at points adjacent said header structure, a windshield wiper actuating shaft for operative connection to a wiper actuating arm, said shaft being journalled in said header structure, a windshield cleaner motor mounted between said roof and ceiling at said point remote from the header structure, and flexible drive means connecting said wiper actuating shaft and said motor.

7. A motor vehicle having an inclined windshield and a roof extending rearwardly therefrom, a ceiling beneath said roof, a header at the top of the windshield and adjacent the forward end of the roof, a wiper shaft journalled in the header with its axis substantially normal to the plane of the inclined windshield, a wiper operatively supported by the shaft for wiping movement on the windshield, a cleaner motor disposed between the roof and ceiling at a point rearward from said header bar, said motor having a drive shaft angularly related to said wiper shaft, and flexible drive means between and operatively connecting the motor drive shaft and the wiper shaft.

8. A motor vehicle having an inclined windshield and a roof structure extending rearwardly therefrom and including a roof, a ceiling beneath the roof and defining a space therebetween, a header structure between the top of the windshield and the roof, a wiper shaft journalled in the header structure with its axis substantially normal to the plane of the inclined windshield, a wiper connected to the shaft for wiping movement on the windshield, a cleaner motor disposed in said space at a point rearward from said header structure, said motor having a drive shaft disposed angularly to the axis of said wiper shaft, a transmission shaft supported by the roof structure and operatively connected to the motor shaft, said header member being provided with a chamber into which said wiper shaft and said transmission shaft extend, and a flexible coupling joining said wiper and transmission shafts within the chamber of said header structure.

9. A motor vehicle having a windshield and a roof structure extending rearwardly therefrom and including a roof and a ceiling spaced beneath the roof, the space between roof and ceiling being increased at a point remote from the windshield, a header structure disposed between the upper edge of the windshield and the roof, a wiper shaft journalled in the header structure, a wiper operatively connected to the shaft, a cleaner motor disposed between the roof and ceiling at such a point remote from the windshield, a transmission shaft between the motor and wiper shaft having detachable connection with the wiper shaft, and means carried by the roof structure for supporting the transmission shaft and serving to guide the latter when making and breaking connection with the wiper shaft, the detachable connection between the transmission shaft and the wiper shaft being made and broken upon axial movement of said transmission shaft in its supporting means.

10. In a motor vehicle having a windshield and a roof structure extending rearwardly from the windshield, a header between the roof and the upper edge of the windshield, a wiper shaft journalled in the header having its forward end connected to a wiper carrying arm adjacent the outer surface of the windshield, means for actuating the wiper shaft mounted in said roof structure at a point rearwardly of and remote from the header, a drive shaft extending from said means into adjacency with the other end of said wiper shaft, and a flexible driving connection between the adjacent ends of said shafts at a point substantially at the intersection of the planes of said windshield and said roof structure.

HENRY HUEBER.
ERWIN C. HORTON.